March 24, 1925.
W. O'BRIEN
1,530,609
COMBINED BELT TIGHTENER AND BRAKE FOR SAND REELS
Filed May 11, 1922 2 Sheets-Sheet 1
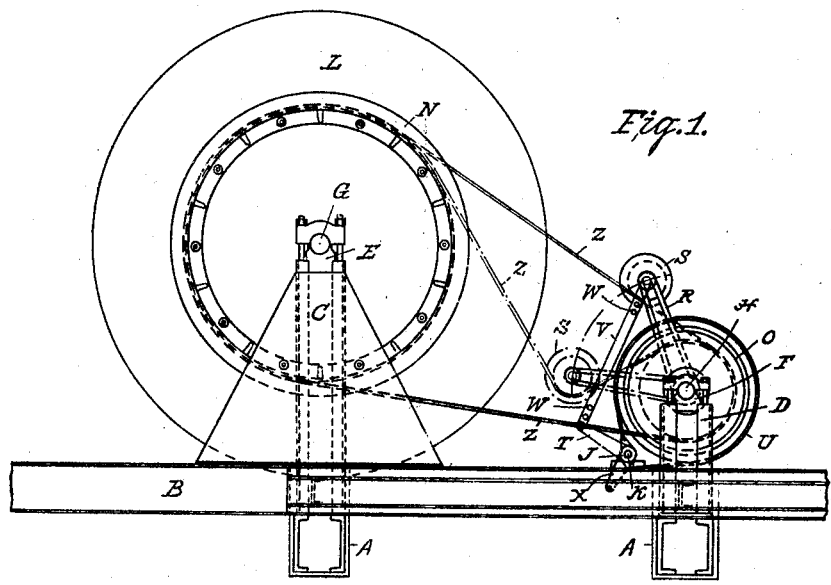
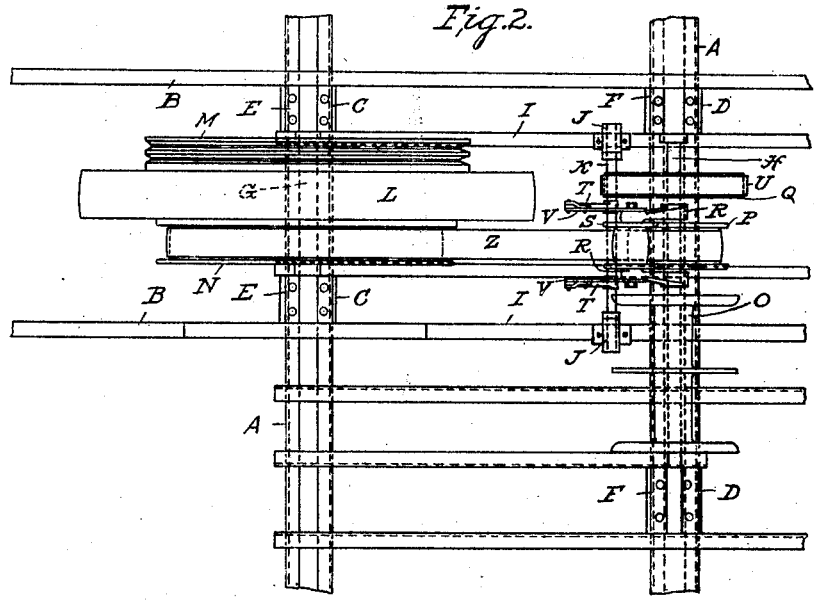

March 24, 1925.  1,530,609
W. O'BRIEN
COMBINED BELT TIGHTENER AND BRAKE FOR SAND REELS
Filed May 11, 1922  2 Sheets-Sheet 2
Fig.3.
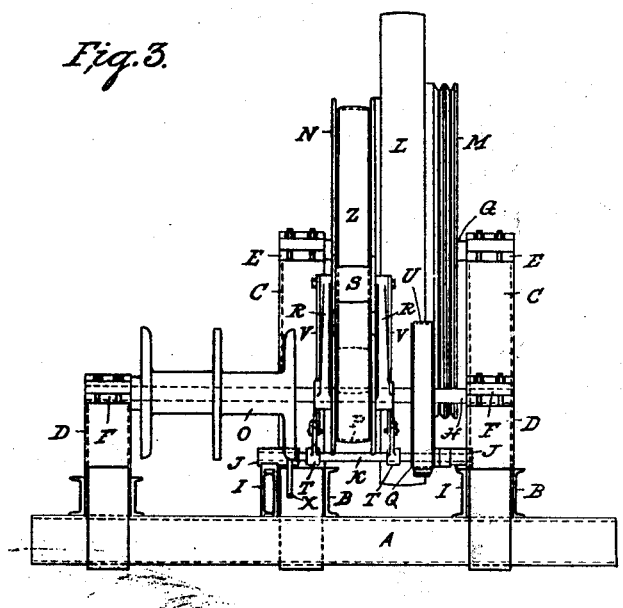
Fig.4.
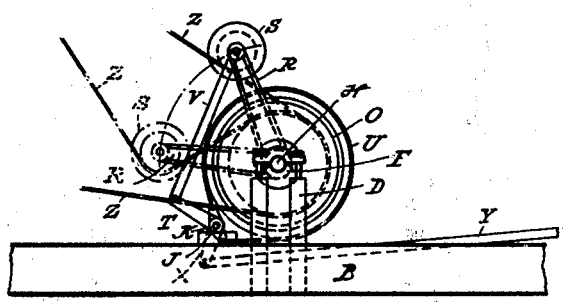
Fig.5.
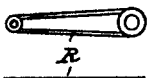
Fig.6.
Witnesses:
Joel C. Decker
Jos C. Algeo
Inventor,
William O'Brien,
By
Mark M. Decker
Attorney.

Patented Mar. 24, 1925.

1,530,609

UNITED STATES PATENT OFFICE.

WILLIAM O'BRIEN, OF WASHINGTON, PENNSYLVANIA.

COMBINED BELT TIGHTENER AND BRAKE FOR SAND REELS.

Application filed May 11, 1922. Serial No. 560,267.

*To all whom it may concern:*

Be it known that I, WILLIAM O'BRIEN, a citizen of the United States, and a resident of Washington, in the county of Washington and State of Pennsylvania, have invented certain new and useful Improvements in a Combined Belt Tightener and Brake for Sand Reels; and I do hereby declare the following to be a full, clear, and exact description of the invention, such as will enable others skilled in the art to which it appertains to make and use the same.

My invention relates to sand-reels and operating mechanism therefor, and has for its object to provide a sand-reel which is capable of being operated by means of a belt driven by a belt-wheel which is secured on the side of the main belt-wheel.

The invention consists of certain novel features and details of construction as will be more fully described hereinafter and finally pointed out in the claim.

I will now describe my invention reference being had to the accompanying drawings, in which similar letters of reference indicate corresponding parts in the several figures and in which Figure 1, is a side elevation of my invention. Fig. 2, is a plan view of the same. Fig. 3, is a rear elevation, more clearly showing the arrangement of the parts. Fig. 4, is a side elevation of the belt tightener and operating arms and lever. Fig. 5, is a plan view of one of the arms for holding the tension wheel, and Fig. 6, is an edge view of the same.

In the drawings A, represents the cross members to which are secured the sills B, of the belt house. Secured to these cross members A, are the jack-posts C, and sand-reel posts D, each of which are provided with journal boxes E, and F, which carry the crank-shaft G, and sand-reel shaft H.

Intermediate sills I, are secured to the cross members A, and are provided with journal-boxes J, into which is journaled an auxiliary shaft K, the purpose of which will appear hereinafter.

Secured on the crank-shaft G, is the main belt-wheel L, on one side of which is bolted or otherwise secured to the bull-rope-wheel M, and on the opposite or face side the belt-wheel N, for operating the sand-reel proper. Secured to the sand-reel shaft H, is the sand-reel O, belt-wheel P, brake-wheel Q, and arms R, which carry the tension wheel S, and secured on the auxiliary shaft K, are the operating arms T, and the brake-band U. The arms R and T, being connected by means of rods or bars V, which are provided with series of holes W, which form means of adjustment between said arms R and T.

An additional arm X, is secured to the auxiliary shaft K. This arm is connected to one end of the operating rod or bar Y, which runs from the derrick.

The operation of my invention is as follows:

A belt Z is placed on and over the belt wheel N, passing under the tension wheel S, and over and around the belt-wheel P. The tension-wheel being in the position shown in full lines Figs. 1 and 4. In this position the brake band U, is brought into contact with the brake-wheel Q, which holds the sand-reel O, and shaft H, from revolving.

When ready for the bailing process the lever in the derrick (not shown) is pulled back which draws the rod or bar Y, inward towards the derrick, which movement causes the auxiliary shaft K, to partly revolve, thus drawing the arms T, downward which in turn causes the rods or bars V, and arms R, to descend bringing the tension-wheel S, in contact with the belt Z, pressing it downwards as shown in Figs. 1, and 4, (dotted lines) and causing it to tighten said belt which will then be revolved by the belt-wheel N, said belt in turn will impart a rotary motion to the belt-wheel P, shaft H, and sand-reel O. When in this position, the brake-band U, will be released, thus permitting the sand-reel proper to revolve freely.

When the bottom of the bailer has reached the floor of the derrick, the lever is pushed back which causes the tension-wheel to be lifted upward slacking the belt and tightening the brake-band on the brake-wheel, preventing the reel proper from turning.

By the use of my improvement the sand-reel may be set square with the derrick, whereas by the old fashioned wooden sand-reel, it had to be set angling to the derrick and was operated by a friction wheel which was brought into contact with the main belt-wheel on the crank-shaft.

Having described my invention what I claim as new and desire to secure by Letters Patent is:

A combined belt-tightener and brake for sand-reels, consisting in combination with a drum-shaft, drum and belt-wheel, of arms movably secured on said drum-shaft and having secured in the outer ends thereof a friction-wheel, an auxiliary-shaft mounted in bearings which are secured to the auxiliary-sills, arms rigidly secured to said auxiliary-shaft and connected by means of rods to the outer ends of the arms which carry the friction-wheel for moving said friction-wheel into and out of engagement with the belt, a brake-wheel secured on said drum-shaft together with a brake-band one end of which is connected with the auxiliary-shaft and adapted to be drawn into engagement with the brake-wheel when the tension wheel is released, all substantially as shown and described.

In testimony that I claim the foregoing as my own invention, I have hereunto set my hand in the presence of two witnesses.

WILLIAM O'BRIEN.

Witnesses:
MARK M. DECKER,
A. C. MILLER.